March 31, 1936.    R. ETZKORN ET AL    2,035,645
CUPRAMMONIUM CELLULOSE FILM
Original Filed Aug. 26, 1933
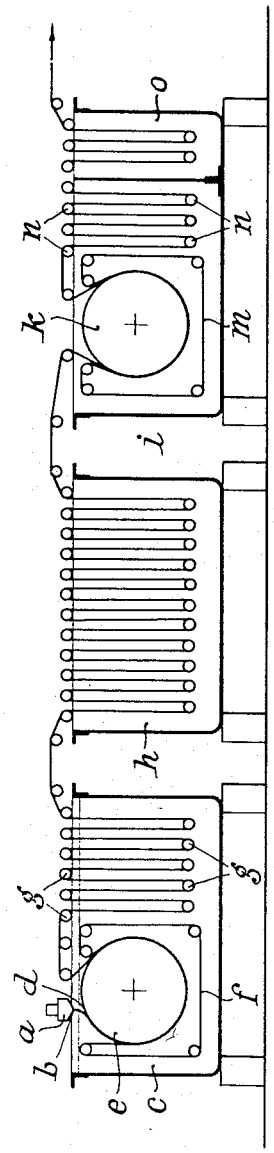
WITNESS
INVENTORS
RUDOLF ETZKORN
EWALD KNEHE
BY
ATTORNEYS Patented Mar. 31, 1936

2,035,645

UNITED STATES PATENT OFFICE 2,035,645

CUPRAMMONIUM CELLULOSE FILM

Rudolf Etzkorn and Ewald Knehe, Wuppertal-Barmen, Germany, assignors to I. P. Bembery Aktiengesellschaft, Wuppertal - Oberbarmen, Germany, a corporation of Germany Original application August 26, 1933, Serial No. 687,001. Divided and this application June 19, 1934, Serial No. 731,284. In Germany September 3, 1932

7 Claims. (Cl. 18—57)

The present invention relates to the production of films from copper oxide ammonia cellulose solution of unusual thinness and having novel and improved properties.

It is the object of this invention to provide a method of making thinner the freshly spun foils obtained by squirting out a cuprammonium cellulose solution by stretching before complete coagulation has taken place, and by avoiding thickening of the film by transverse shrinkage during the after treatment.

Further objects of the invention will become apparent from a perusal of the following description and the drawing in which is diagrammatically shown in cross-section an apparatus for carrying out the process in practice.

The present application is a division of our application Serial No. 687,001, filed August 26, 1933.

There is a need for an extremely thin, absolutely transparent cellulose hydrate foil possessing only an extremely small weight per square meter. The finest cellulose hydrate foils now on the market have a thickness of a minimum of 0.02 mm. and consequently a weight per square meter of 30 grams. The other brands have a considerably greater weight. For manifold purposes, however, this thickness of the foil has proved to be much too high and accordingly unusable for the purposes in view, especially as the finest gauge sheets heretofore made have been manufactured from viscose and have only a comparatively small degree of toughness.

Thus, there exists a demand for extremely fine cellulose hydrate foils, for example for the binding of bass strips in the manufacture of hat material. The finest, thinnest cellulose hydrate foils used theretofore, even of a weight of only 30 grams per square meter, burden the bound hemp far too much and the flexibility is too slight. In the other uses of cellulose hydrate foils it is a question of covering and lining objects of an uneven surface in such a manner that the contours can be apparent through the cellulose hydrate. For these purposes even the thinnest cellulose hydrate foils made heretofore are not utilizable, because they are too thick, too stiff, too glass-like and too little plastic.

The most diverse ways have been tried in order to produce a film from cellulose hydrate which is extremely fine, clear as glass and much finer than the finest gauges produced up to now. Particularly the methods applied heretofore in the industry of working up viscose with or without the use of a pouring base did not lead to the goal nor to any usable product.

It has now been found that it is possible to produce extremely fine cellulose hydrate foils by extruding cuprammonium cellulose solution according to the squirting process out of narrow slits of 0.05 to 0.5 mm. width of slit and the nap is drawn off by means of delivery rollers through a coagulating or precipitating bath of diluted soda lye and, if desired, stretched to the required fineness, and the structure then by suitable rotating transport devices conducted through the necessary after-treatment baths for washing, acidifying and loading with glycerine, and if necessary then dried in a manner known per se over a system of drying cylinders and finally the thus obtained film is sub-divided in the desired way directly or after previous winding.

Tests have proved that it is preferable not to allow the so-called pourer or hopper to dip into the precipitating bath. The reason for this is to be found in coagulation on the pouring slit, which can lead to stopping up the slit.

Now in order to remedy the defects spoken of and to effectuate a proper precipitation of the nap coming from the slit, the nap is conducted through a stretch of air measuring a few millimeters and thereupon through a free bath passage measuring several centimeters and then allowing the film to run inside the bath onto a drum of comparatively large circumference, which by adhesion prevents the nap, as it solidifies into a film, from shrinking transversely and thereupon the film is passed for further treatment to the subsequent transport elements.

The stretch of air is chosen best as small as possible. It has been found that a distance of 1 to 10 millimeters between the slit and the level of the precipitating bath is best. The smaller values will be availed of when the surface of the precipitation bath is practically calm and the greater distances when the surface of the precipitating bath is not quite so calm. If the stretch of air is too large the nap issuing from the slit contracts towards the center, and in addition an accumulation of material takes place at both sides of the nap, which produces a thickening of the film at the edges.

The free bath passage is best chosen at a length of about 10 to 20 cm. By this means the coagulation takes place at both sides of the nap. Too long a free precipitating bath passage is to be avoided on account of the transverse shrinkage setting in when the nap solidifies into a film. This preliminary coagulation of the film while unsupported on either side insures a product which is substantially equally smooth on both sides, as distinguished from a process in which a cellulose solution is poured upon a surface, the solvent permitted to evaporate and the dried film then stripped off, the film in such case being relatively rough on its supported side.

The drum, onto which the film or band is allowed to run after passing through the free stretch of bath, is made comparatively large, for the greater the circumference of the drum, the smaller the angular speed of the drum is able to be kept. Drums of a diameter of 80 cm. are adequate. It is, however, preferable to use drums of a diameter of 1 meter or more.

The transverse shrinkage of the film is prevented extensively by the drum. This is due to the fact that the film, owing to adhesion, adheres firmly to the surface of the drum. By utilizing the known endless press-on bands or by other devices opposing the transverse shrinkage of the film the effect of the adhesion force can be still considerably increased.

An appreciable transverse shrinkage of the film takes place not only directly after the pouring but also on entrance of the film into the first acid bath. It is, therefore, advisable to provide also in such bath a drum with a comparatively large circumference, which can also be used in combination with endless press-on bands in the same manner as the first large drum. The diameter of the usual transport rollers, with which the film is transported, preferably in an up and down direction, through the various after-treatment baths, is of relatively small importance, even though it is also advisable not to make the diameter of these too small. Of great importance, however, are the dimensions of the just described two drums, the one arranged directly after the pourer and the other at the entrance of the film into the first acid bath, because on these two places the symptoms of transverse shrinkage are particularly great.

Inter alia a composition of 7.2% cellulose, 7% ammonia and 3.5% copper can be used as the copper-containing spinning solution.

The drawing shows diagrammatically a device adapted for the production of films according to the invention. The spinning solution with a composition just described is squirted by air pressure or suitable pumps in the manner well known in the production of viscose films out of a slot of a pouring device or hopper $a$ which is adjusted to a width of 0.15 mm. The nap thus formed is, however, not introduced directly into the coagulating liquid but first passes through a stretch of air $b$ of 5 mm. Hereupon it enters a coagulating bath $c$ consisting of 4.5% soda lye. The nap is conducted through the free 16 cm. long bath stretch $d$ and thus coagulated from both sides. The pre-coagulated film is then allowed to run on the drum $e$ having a diameter of 1 meter. The outside edges of the film lying on the drum are pressed onto the drum by the press-on bands $f$, so that a transverse shrinkage of the film during the first steps of coagulation is avoided. The film is then released from the drum and is conducted further through the coagulation bath coilwise over rollers $g$ each of a diameter of 10 cm. Thereupon follows an after-treatment with pure water in the trough $h$ and an acidifying treatment in trough $i$ to remove copper and other impurities. The tank $i$ contains 10% solution of sulphuric acid. As the film in the acid treatment also has a strong tendency to shrink, care is taken according to the invention to prevent such shrinking. This is done by conducting the film once more over a drum $k$ having a large diameter, so that a strong adhesive action is produced between the film and the supporting base. The drum $k$ has a diameter of 1 meter and is equipped with press-on bands $m$ in the same manner as drum $e$. After being released from this drum $k$ the film is further conducted through the acid bath by the small rollers $n$, then through a water bath $o$ and hereupon passed into a glycerine bath and then to a drying apparatus and a cutting device. As the appliances for this are well known to those skilled in the art a more detailed description is unnecessary.

By this means it is possible to produce extremely thin cellulose hydrate films as clear as glass with a weight of less than 15 grams per square meter. It is even possible with the greatest ease to make such films of merely 10, 8, 6 and even 5 grams in weight per square meter. Such thin structures manufactured from copper-containing cellulose solution and precipitated in soda lye have quite a peculiar character. They are absolutely transparent, and their presence in single film form is scarcely perceptible to the eye in certain positions. The structures have lost the glass-like, brittle nature of known films. The foils are as extremely pliant as gold leaf; they are, therefore, especially suitable for covering foreign objects even with uneven surfaces. With their unsurpassed fineness, pliability and great plasticity the foils are capable of adapting themselves to and fitting all unevenness.

Their extremely low weight, their toughness and comparatively great resistance make them ideally suited for covering and packing small objects with great surface, especially when a packing material is required that does not appreciably increase the weight of the package.

The foils can be crumpled by hand or by machine in operations and made completely smooth again. Whole foils or strips can be knotted like threads, the knots undone and the foils or strips then smoothed again.

In speaking of a foil which is clear as glass, we mean a product consisting of regenerated cellulose without bubbles, stripes and other internal structural irregularities. It is, however, possible, for example by suitable additions, such as finely ground inorganic pigments, to deprive the foil of its character of being clear as glass, to make it nontransparent or opaque, or it may be dyed, either by subsequent treatment or by adding corresponding substances directly to the spinning material.

We claim:
1. Absolutely transparent cellulose hydrate foil substantially equally smooth on both sides and manufactured from copper oxide ammonium cellulose solution and having a weight per square meter of less than 5 grams.
2. Extremely pliable cellulose hydrate foil substantially equally smooth on both sides and having a weight per square meter of less than 10 grams.
3. Extremely pliable cellulose hydrate foil substantially equally smooth on both sides and having a weight per square meter of less than 5 grams and capable of being crumpled and knotted and then smoothed out again to substantially its original condition.
4. A glass-clear film of regenerated cellulose which is uniformly smooth on both sides thereof and is produced from a copper oxide ammonium cellulose solution, said film being of substantially a uniform thinness of less than 5 grams per square meter.

5. A glass-clear film produced from a copper oxide ammonium cellulose solution, said film being uniformly smooth on both sides thereof and being of substantially a uniform thinness of less than 15 grams per square meter.

6. A glass-clear film produced from a copper oxide ammonium cellulose solution and being of a substantially uniform thinness of less than 10 grams per square meter, said film being free of blow-holes, striations, or other internal structural irregularities.

7. A transparent foil of regenerated cellulose which is substantially equally smooth on both sides thereof and has a thickness no greater than corresponds to a weight of about 15 grams per square meter.

RUDOLF ETZKORN.
EWALD KNEHE.

CERTIFICATE OF CORRECTION.

Patent No. 2,035,645.

March 31, 1936.

RUDOLF ETZKORN, ET AL.

It is hereby certified that the name of the assignee in the above numbered patent was erroneously written and printed as "I. P. Bembery Aktiengesellschaft" whereas said name should have been written and printed as I. P. Bemberg Aktiengesellschaft, of Wuppertal-Oberbarmen, Germany, a corporation of Germany, as shown by the records of assignments in this office; and that the said Letters Patent should be read with this correction therein that the same may conform to the record of the case in the Patent Office.

Signed and sealed this 12th day of May, A. D. 1936.

Leslie Frazer (Seal)

Acting Commissioner of Patents.